Oct. 7, 1941.  G. M. CRESSATY  2,258,542
ILLUMINATED VANITY CASE
Filed June 14, 1938  2 Sheets-Sheet 1
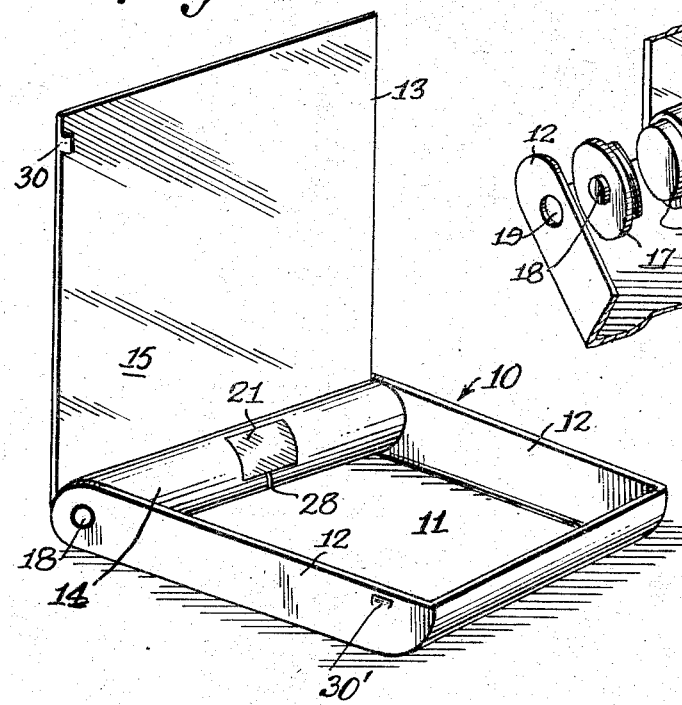
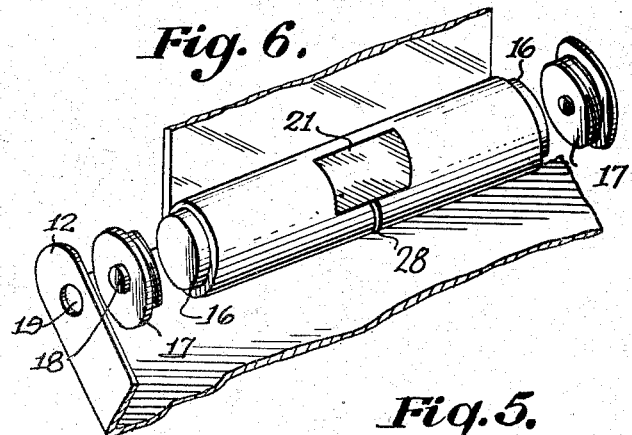
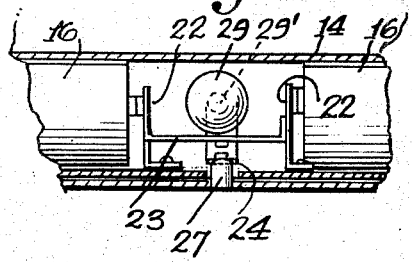
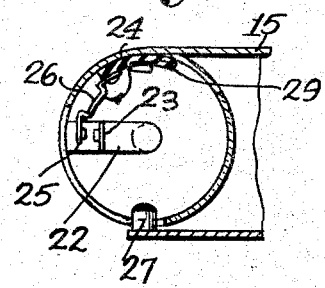
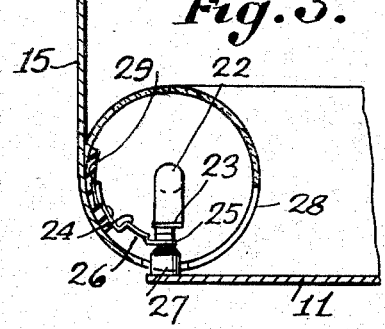
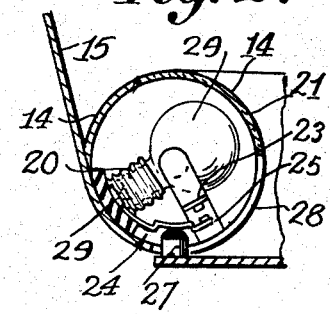
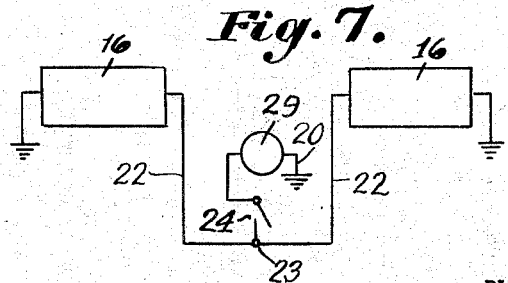
INVENTOR.
GEORGE M. CRESSATY.
BY David W. Gould
ATTORNEYS.

Oct. 7, 1941.　　　G. M. CRESSATY　　　2,258,542
ILLUMINATED VANITY CASE
Filed June 14, 1938　　　2 Sheets-Sheet 2

INVENTOR.
GEORGE M. CRESSATY.
BY David W. Gould
ATTORNEYS.

Patented Oct. 7, 1941

2,258,542

UNITED STATES PATENT OFFICE 2,258,542

ILLUMINATED VANITY CASE

George M. Cressaty, New York, N. Y.

Application June 14, 1938, Serial No. 213,673

14 Claims. (Cl. 240—6.45)

This invention is directed to a vanity case and like carrier, having its own lighting source and providing automatic controlling means for such lighting source, with lenses controlling the rays of said lighting source for proper make-up in dark places and at night-time.

A primary object of the invention is the provision of a vanity case having a lighting unit in which the light source is automatically energized and deenergized at the will of the user, with no manually operable or controlling means for said light source other than the simple movement of the cover or of the body of said case.

A further object of the invention is the provision in the improvement above described wherein the light source may be energized in the movement of the cover throughout a particular degree of such movement and be deenergized, and remain deenergized, throughout the remaining degree of movement of the cover, whereby the cover may be opened, and, within a definite extent of movement, the light source energized, while in the other relative movements of the cover the light source will be, and remain, deenergized, thus permitting the user to energize the light source by moving the cover to and through a predetermined arc, or to prevent such energization by moving the cover through other arcs. This provides, within the selection of the user and entirely without any particularly-directed operation on her part, for moving the cover to a position in which the mirror is completely available for use and the light energized, or to another position in which the mirror is still completely available for use while the light is deenergized.

A further object of the invention is the provision of a lighting unit which is so modern as to provide for a hinged movement of such unit in the opening of the vanity case for use, with means for automatically controlling the energization and deenergization of the lighting unit as an incident to such hinged movement and at predetermined positions of such hinged movement, whereby the user, through control of said movement, may at will obtain or dispense with the artificial illumination of the lighting unit.

Other objects and advantages of the invention will become apparent during the course of the following description and claims, with the accompanying drawings, in which like reference characters refer to similar parts throughout the several views, and in which:

Figure 1 is a perspective view of the preferred form of the invention, the cover being shown open;

Figure 2 is an enlarged broken sectional view through the lighting unit and cover, the circuit controlling switch being shown in the neutral or non-energizing position;

Figure 3 is a similar view with the switch shown in energizing position;

Figure 4 is a similar sectional view with the cover closed;

Figure 5 is a fragmentary view of the batteries, connecting element and switch mechanism in elevation;

Figure 6 is an exploded perspective view of the lighting unit hingedly mounted, and of means for connecting one portion of the terminal of the batteries to the case;

Figure 7 is a diagrammatic view of the circuit;

Figure 9:
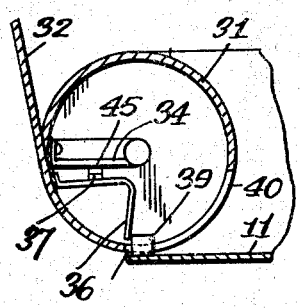
Figure 9 is a similar view indicating the switching means in closed position when the cover has been moved rearwardly from the position shown in Figure 8.

The form of the invention shown in Figures 1 to 7, inclusive, includes a vanity case 10, formed to provide a body 11, the side walls 12 of which are spring strips. The cover 13 is made as a separate part and is hingedly connected with the body, as will later appear. The lower end of the cover is formed as a cylindrical casing 14, constituting part of the lighting unit. The inner surface of the cover is provided with or formed to present a mirror 15, and obviously the cylindrical casing 14 moves with and is in fixed relation to the mirror.

Batteries 16 are placed in the respective ends of the casing 14, and the ends of such casing are closed by caps 17 electrically connecting similar ends of the batteries. The caps are provided with pintles 18, designed to seat in openings 19 in the ends of the spring side walls 12 of the case body. The batteries 16, the cover 13 and the body 11 are thus electrically connected, and the cover and carried lighting unit are supported for pivotal movement. By outwardly spring the walls 12, the caps 17 may be removed and the batteries rendered accessible for renewal when necessary.

A lamp socket 20 is secured in the casing 14 between the inner ends of the batteries, and the wall of the casing 14 is formed with a lens-receiving opening 21, in line with the socket. One side of the batteries, as previously described, is connected through the casing 14, and the opposite battery terminals contact lateral metallic arms 22, which extend toward the wall of the casing 14, and then meet longitudinally, as at 23, providing one terminal of the normal circuit interruption.

Secured to, movable with, and insulated from the casing 14 is a spring switch arm 24, which, at its free terminal, has an offset portion 25 which extends outwardly relative to the center of the casing. Intermediate the offset 25 and the insulating support, the switch arm 24 is inwardly offset at 26 relative to the center of the casing 14. The casing is provided with a fixed pin 27, carried by the bottom of the body of the case 11 and extending into the path of movement of the switch arm 24, the casing 14 having a slot 28 to permit movement of the casing 14 during cover movement without interference with the pin 27.

As the casing 14 moves with the cover, the bulb 29 in the casing, the batteries, the switch arms 22 and 23, and the switch arm 24 move with the casing 14. When the cover 15 has reached a point at approximately 90 degrees to the body, the offset 25 rides on the pin 27, the upper end of which carries insulating material, and the switch arm 24 is moved upwardly to bridge the gap at the contact point 23 and close the circuit at this point. As the switch arm 24 is connected through conducting strip 29' with the center terminal of the lamp socket, the circuit is completed. The control of the switch arm 24 by the pin 27 is continued until the cover reaches a point at approximately 100 degrees to the body, while beyond this point the pin no longer affects the switch arm and the light is automatically extinguished. During the initial raising of the cover up to a point short of a 90-degree angle, the offset 26 is aligned with the pin 27 and movement of the switch arm 24 is avoided.

Thus, the cover may be raised to approximately 80 degrees without energizing the light source, and then, entirely without attention on the part of the user, the light source is energized and remains energized for approximately a 20-degree further travel of the cover, following which, on further movement of the cover, the light is extinguished. Thus, the lighting unit is automatically energized and deenergized by mere usual operation of the cover, the light remaining effective through that movement of the cover between the limits of which the cover, or more particularly the mirror, is in the most convenient position for practical use.

In this form, the lighting unit as a whole, and particularly the light source, has a constant fixed relation to and moves at all times with the mirror. The important characteristic is the arrangement by which the light source is both automatically lighted and extinguished, and is lighted and remains lighted only through those positions of the cover in which the mirror is most advantageously positioned for use.

The side walls 12 of the cover have been defined as of a more or less resilient or spring character, and are utilized as a means for releasing the cover for opening. The cooperating means for holding the cover closed is indicated at 30, from which it will be obvious that a slight inward pressure at 30' on the spring arms releases these cooperating means 30 and permits the cover to move toward operative open position.

Figure 10:
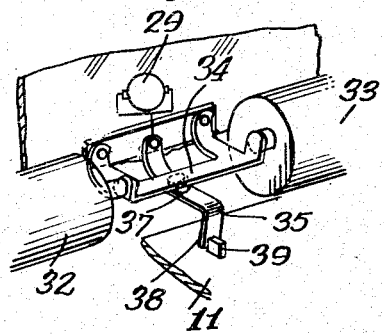
Figure 10 is a broken perspective view illustrating the switching means more clearly.
Figure 8:
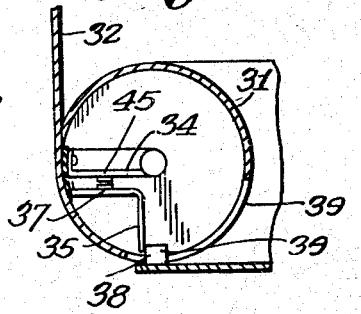
Figure 8 is a view in section showing the lighting unit constructed substantially as in Figure 2, the switch controlling means being slightly modified, and the switch shown in open position.
Figure 11:
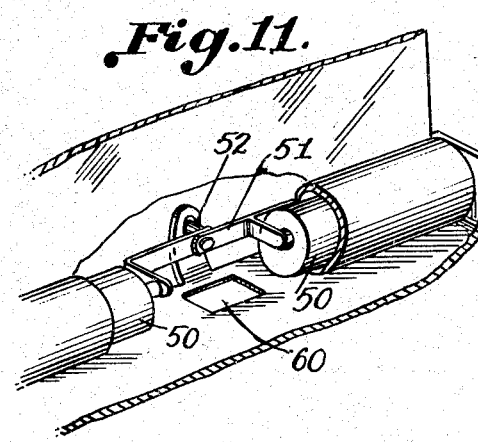
Figure 11 is a broken perspective view showing a modified form of switch control for the energization and deenergization of the lighting unit.
Figure 12:
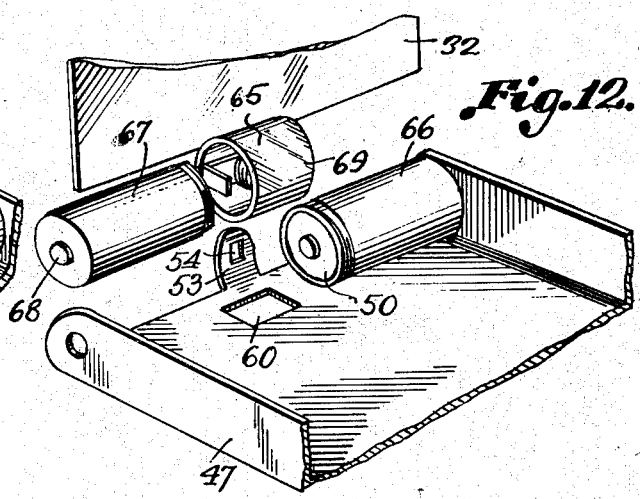
Figure 12 is a similar view showing a portion only of the switch control.

In Figures 8, 9 and 10, there is indicated a slightly modified switching means for use in connection with the lighting unit shown in Figure 1, the lighting means of Figures 8, 9 and 10 being arranged, however, to control the light when the cover is in a position varying from that in the form shown in Figures 1 to 7, inclusive.

In Figure 8, the lighting unit includes a cylindrical casing 31 which is hingedly mounted to and movable with the cover 32, as is the lighting unit of the form shown in Figure 1. The batteries 33 are arranged in the casing 31, similar terminals of each being grounded through the body of the vanity case, as in the form shown in Figure 1, and the opposite terminals connected by a buss bar 34. Within the casing 31 is secured a spring strip 35 which is insulated from the casing 31 and connected with that terminal of the lamp socket which would complete the circuit through the compact body connected ends of the batteries. The switch arm 35 is bent to form a lateral offset section 36, and is also provided, intermediate its length, with a contact point 37, which is opposite the buss bar 34. The free end 38 of the offset portion 36 of the switch arm is arranged in the path of a stop member 39 which is secured to the bottom of the body of the vanity case, the casing 31 being formed with a slot 40 to permit movement of the lighting unit without interference with the stop.

In this form, when the cover has reached approximately a point at 90 degrees to the body of the vanity case, the end 38 of the spring arm is in engagement with the stop 39, but this engagement is insufficient to bend the lateral offset portion 36 of the switch arm, and therefore the contact 37, on the switch arm 35, is free of the buss bar 34, or more particularly of the contact 45 on said buss bar. When the cover 32 is moved farther from the plane of the body of the vanity case, as indicated more particularly in Figure 9, the corresponding movement of the switch arm bends or inclines the portion 36 of that switch arm by reason of the fact that the free end of this portion of the switch arm is prevented from movement by the cooperation of the lateral portion 38 and the stop 39. Therefore, during this movement, the contact point 37 on the switch arm 35 and the one on the buss bar 34 are brought into contact, and the circuit between the batteries and light source is completed.

Of course, it will be appreciated that the relation of the parts may be such as to compel energization of the light source at any inclination of cover to the body beyond the approximately the 45-degree position.

A slightly modified construction of the switch parts over the two previous forms is illustrated in Figures 11 to 15, inclusive. Aside from the modified details hereinafter specifically described, the parts of the vanity case are similar to that of the preferred form, and the description of such parts need not be duplicated.

In this modified form, the lighting-unit housing, corresponding to the housing 14 of the preferred form, is constructed of several separable sections. There is a central section 65, which is secured to and movable with the cover 32, in which central section the lamp or light source 49 and the switch parts are housed. Battery-carrying sections 66 and 67 are provided at their relative inner ends for threaded connection with the central section 65. Thus, when the sections 65, 66, and 67 are connected, a unit housing is provided.

The sections are formed at the ends remote from the central section with pintles 68, for cooperation with the spring sides of the body, as in the first form. Thus, when assembled, the light-unit housing moves with the cover as a single element, but either or both of the sections 66 and 67 may be removed from the central section to permit convenient replacement of the batteries 50. The central section 65 has an appropriate opening to receive a lens 69, which lens is mounted for convenient removal in order to permit ready replacement of the light source 49.

The batteries 50 are connected by a buss bar 51 of spring type, which is supported by and insulated from the cover 32 and also has an outstanding pin 52, which is insulated from the buss bar.

Figure 13:
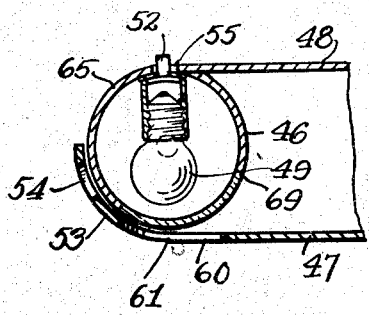
Figure 13 is a broken vertical section through the vanity case, the parts being shown closed and the switching element in inoperative or open-circuiting position.
Figure 14:
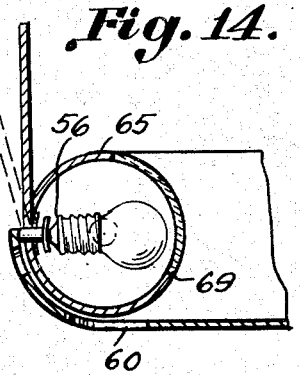
Figure 14 is a similar view with the sections in open relation and the switch parts in operative or circuit-closing relation.

In Figures 11, 12, 13 and 14, the bottom wall of the body section 47 has an upstanding lip 53 arranged in the path of movement of the pin 52, in the hinging movement of the body and cover. The lip 53 is formed just below its upper end with an opening 54 of a size to permit the passage of the pin 52 therethrough. The lip 53 is formed in a curve concentric with the movement of the free end of the pin, and the housing 46 is formed with a slot 55 through which pin 52 normally projects. As the cover 48 is moved to a position substantially at right angles to the body, as shown in Figure 14, the pin 52 will engage that portion of the lip 53 above the opening 54, whereupon the pin is forced inwardly and the buss bar 51 forced in contact with one terminal 56 of the lamp socket, the other terminal of which is grounded to the housing 46, as is one terminal of each of the batteries 50. Under these conditions, the circuit for the lighting unit will be completed and the lamp will be lighted to provide the desired illumination. On slightly further opening movement of the lid, the pin 52 will register with the opening 54 and the lip 53, relieving the pin of pressure, and permitting the buss bar 51, under its inherent resiliency, to move to a position to break the circuit. On continued swinging of the lid in open direction, the pin will again engage the lip and close the circuit.

Figure 15:
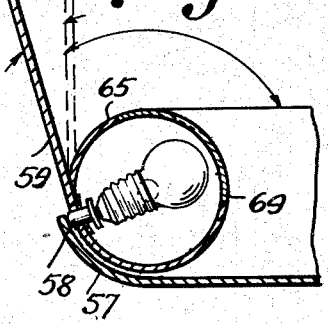
Figure 15 is a view similar to Figure 14 showing a modified construction of switch parts to energize and deenergize the lighting unit when the cover of the vanity case is at inclinations varying from the operative inclinations of the constructions shown in Figure 14.

As illustrated more particularly in Figure 15, the lip corresponding to the lip 53, here indicated at 57, is free of the opening 54, and is preferably of less length than the lip 53. Under these circumstances, as the cover moves to open position, the pin, indicated in Figure 15 at 58, will not engage the lip 57 until the cover, here indicated at 59, is at a greater rearward inclination than the operative position of the cover in Figure 14. Furthermore, in this modified lip form, energization of the lighting unit remains constant during the full further opening movement of the cover, after the switch is closed.

Obviously, in both forms, by the movement of the cover towards closed position, as the pin 52 rides off of the free end of the lip 53 in the first case, or as the pin 58 rides off of the lip 57 in the second case, the circuit to the lighting unit will be deenergized, and this deenergization will remain constant during the further closing movement of the cover.

In the switch parts shown in Figures 11 to 14, the energization of the lighting unit may be selectively perfected when the cover reaches a position at substantially right angles to the body, deenergization being effected on a slightly further opening movement of the cover, followed by energization on a continued open movement of said cover. In Figure 15, the relation of the lip 57 to the hinging movement of the cover is such that energization of the lighting unit will not be perfected until the cover reaches the position rearwardly, in opening movement, to a position at right angles to the body, the energization being thereafter maintained in any further opening movement of said cover.

The housing 46 is formed with a lens-covered opening 60 for the emission of intensified controlled light under energization of the lighting unit. When the cover is closed it will be noted, as indicated in Figure 13, that the lens covered outlet registers with an openings 61 in the bottom of the body section. Therefore, when the cover is closed, artificial illumination may be provided by manually depressing the pin 52, in which condition the light produced by the energization of the lighting unit will pass through the opening 61 and be usuable for purposes other than that directly concerned with the vanity case, as, for example, for flashlight use.

In the various forms disclosed and described above, it is apparent that the relative movement between the cover and body, and particularly of the lighting unit, is responsive to a hinging action during which the lighting unit and contained parts are movable bodily incident to such hinging action. During the hinging action, and at appropriate selective relation incident to such action, the lighting unit is automatically energized and deenergized. This permits the user of the vanity case to move the cover to a position to permit use of the mirror without causing artificial illumination, and to move said cover to another position and produce desired artificial illumination. The user thus has the advantage of an automatically controlled unit, and yet may, due to this improved construction, effect appreciable saving in the life of the batteries in said lighting unit.

It will, of course, be appreciated that in the various forms disclosed and described, the energization and deenergization of the lighting unit is controlled by the cover movement, but it is obvious that exactly the identical results may be accomplished by further appropriate movement of the body rather than of the cover. This enables the user to place the cover and mirror in a position best suited for reflection of her face, and then automatically control the lighting unit by moving the body. In these conditions, in the form shown in Figures 11 to 15, for example, the parts may be reversed from that illustrated, and the housing of the lighting unit may be formed as part of the body, and the actuating lip as a part of the cover. Such a specific arrangement is contemplated as being within the definition both in the specification and in the claims.

While a detailed portrayal has been given of some of the forms the invention may take, in the optical as well as in its mechanical characteristics, it is not intended to limit the invention to the above description. The nature of the invention is such that it may be applied in connection with a multitude of different uses. The invention may be used in connection with a multitude of compacts, vanity cases, cigarette cases, hand bags, lip stick or any other cosmetic carriers of different shapes or sizes. Various modifications and changes, or rearrangement of parts, may be made without departing from the spirit of the invention and the scope of the appended claims.

What is claimed as new is:

1. A vanity case including a body, a cover, a cylindrical housing formed with one of said parts and providing for a hinged connection with the other of said parts, a lighting unit in the housing including a lamp socket, a spring bus bar arranged in a lighting unit circuit and movable to make or break such circuit with one terminal of the lamp socket, a pin carried by the bus bar for operating the same, said pin projecting through the housing, and a lip formed on that part other than the part carrying the housing to engage and operate said pin to move the bus bar to close the circuit under a predetermined relative hinging movement of the cover and body.

2. A vanity case including a body, a cover for the body movable to open and close the body, a lighting unit housing mounted within the body for rotative movement with the cover in the movement of the latter relative to the body, said housing containing a lighting unit, a plurality of casing sections mounted coaxially with the housing to receive a source of electrical energy, and cooperating means on the housing and body for energizing or deenergizing the lighting unit under predetermined movement of the cover.

3. A vanity case including a body, a cover hinged to the body, a mirror carried by and movable with the cover, a light source in the cover, energizing means for the light source including a circuit arranged wholly in the cover, a switch for controlling the energizing means, said switch being carried solely by the cover, and means carried by the body and responsive to a predetermined movement of the cover to close the switch, said means being formed to avoid switch-closing function in the opening movement of the cover other than said predetermined movement.

4. A vanity case including a body, a cover movably connected to the body, a mirror carried by the cover, a light source carried by the cover, energizing means for the light source including batteries and a circuit, both carried by the cover, a switch for the circuit, said switch being carried solely by the cover and normally inoperative to close the circuit, and means fixed with relation to the body and operating to engage and close the switch in the movement of the cover relative to the body and throughout a predetermined movement only of cover movement.

5. A construction as defined in claim 4 whereby the light source, switch, and energizing means are arranged in a protective housing carried by the cover.

6. A construction as defined in claim 4, wherein the light source, energizing means and switch are arranged in a protective housing forming part of the cover, and wherein the body-carried switch-operating means operates through said housing.

7. A vanity case including a body, a cover movable relative thereto, a mirror carried by the cover, a light source, batteries, a circuit including the light source and batteries, said light source, switch, batteries and circuit being carried by the cover, the switch being normally in noncircuit-closing position, and means fixed to the body and engaging the switch to close the circuit throughout a predetermined movement of the cover relative to the body.

8. A construction as defined in claim 7, wherein the switch includes a spring element, and wherein the means carried by the body for operating the switch includes a member to deflect the switch against its spring tendency.

9. A construction as defined in claim 7, wherein the switch includes a spring element formed inwardly of its free end with an offset, and wherein the body carried means only operates the switch when free of said offset.

10. A construction as defined in claim 7, wherein the cover is provided with a housing to receive the light source, batteries, circuit, and switch, with such housing constructed of separable parts to provide for insertion and removal of the batteries.

11. A construction as defined in claim 7, wherein the cover is provided with a housing to receive the light source, batteries, circuit, and switch, with the ends of the housing removable to permit battery removal and replacement, the ends of the housing proving supports for the movable support of the cover relative to the body.

12. A vanity case including two hingedly connected sections, a lighting unit carried by one of the sections energizing means for the lighting unit carried by one of the sections, a switch element for controlling the energizing means, and a projection on one of the sections to engage and actuate the switch during hinged movement of the sections, said projection providing for freeing the switch element throughout a part of the otherwise operative movement.

13. A vanity case including two hingedly connected sections, a light source in one section, an energizing means for the light source, a switch element for controlling the energizing means, and a projection on one of the sections to engage and operate the switch element in the relative hinging movement of the sections, said projection being formed with an opening to avoid influencing the switch element in a predetermined hinged relation of the sections.

14. A vanity case including two hingedly connected sections, a light source in one section, an energizing means for the light source, a switch element for controlling the energizing means, and a projection on one of the sections to engage and operate the switch element in the hinging movement of the sections, said projection permitting the sections to reach a predetermined open relation without operating the switch and causing switch operation throughout a range of relatively opening movement of the sections varying from such predetermined open position.

GEORGE M. CRESSATY.